United States Patent
Truong et al.

(10) Patent No.: US 10,853,739 B2
(45) Date of Patent: Dec. 1, 2020

(54) MACHINE LEARNING MODELS FOR EVALUATING ENTITIES IN A HIGH-VOLUME COMPUTER NETWORK

(71) Applicant: SAP SE, Walldorf (DE)

(72) Inventors: Tu Truong, San Jose, CA (US); Fuming Wu, Palo Alto, CA (US); Julio Navas, Concord, CA (US); Ajain Kuzhimattathil, Chicago, IL (US); Hanxiang Chen, Burnaby (CA); Nazanin Zaker Habibabadi, Sunnyvale, CA (US); Omar Rahman, San Jose, CA (US); Han Li, Santa Clara, CA (US)

(73) Assignee: SAP SE, Walldorf (DE)

( * ) Notice: Subject to any disclaimer, the term of this patent is extended or adjusted under 35 U.S.C. 154(b) by 784 days.

(21) Appl. No.: 15/618,406

(22) Filed: Jun. 9, 2017

(65) Prior Publication Data

US 2018/0357559 A1  Dec. 13, 2018

(51) Int. Cl.
| | |
|---|---|
| *G06N 20/00* | (2019.01) |
| *G06N 3/08* | (2006.01) |
| *G06N 3/04* | (2006.01) |
| *G06F 3/0481* | (2013.01) |
| *G06N 5/00* | (2006.01) |
| *G06N 20/10* | (2019.01) |
| *G06N 7/00* | (2006.01) |

(52) U.S. Cl.
CPC ........... *G06N 20/00* (2019.01); *G06N 3/0454* (2013.01); *G06N 3/084* (2013.01); *G06F 3/0481* (2013.01); *G06N 5/003* (2013.01); *G06N 7/005* (2013.01); *G06N 20/10* (2019.01)

(58) Field of Classification Search
None
See application file for complete search history.

(56) References Cited

U.S. PATENT DOCUMENTS

| | | | | |
|---|---|---|---|---|
| 2015/0073929 | A1* | 3/2015 | Psota | G06Q 50/28 |
| | | | | 705/26.2 |
| 2016/0155069 | A1* | 6/2016 | Hoover | G06Q 30/06 |
| | | | | 706/12 |
| 2018/0336493 | A1* | 11/2018 | Hayes | G06N 7/005 |
| 2019/0392514 | A1* | 12/2019 | Kassaei | G06Q 40/00 |

* cited by examiner

*Primary Examiner* — Li Wu Chang

(74) *Attorney, Agent, or Firm* — Schwegman Lundberg & Woessner, P.A.

(57) ABSTRACT

In an example, a machine learning algorithm is used to train an entity risk evaluation model to output an entity risk score based on transaction data in a computer network. Entity risk scores for various entities may be stored in a database, and retrieved and displayed upon user interaction with one or more reports involving corresponding entities.

20 Claims, 10 Drawing Sheets

MACHINE LEARNING MODELS FOR EVALUATING ENTITIES IN A HIGH-VOLUME COMPUTER NETWORK

TECHNICAL FIELD

This document generally relates to systems and methods for high-volume computer networks. More specifically, this document relates to machine learning models for evaluating entities in a high-volume computer network.

BACKGROUND

Certain types of computer networks deal with high volumes of transactions as well as high volumes of entities on either side of those transactions. Performing evaluations on entities in that large of a business network can be difficult given the technical problems involved in analyzing that many entities and that many transactions. For example, when the entities include buyers (or receivers) and suppliers of goods and services, it can be challenging to evaluate such suppliers to determine whether they would be a good match for a particular buyer, as well as challenging to evaluate such buyers to determine whether they would be a good match for a particular supplier. Traditional evaluation techniques, such as those used in the financial community, fail to properly evaluate risk and partner strength and weaknesses when used in computer networks with high volumes of transactions. In short, the traditional techniques break down when they are scaled to a high-volume business network.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, advanced machine learning and deep learning techniques are applied to a large volume of transaction data in order to evaluate entities involved in the underlying transaction. The output of the models trained on these advanced machine learning and deep learning techniques is a score for an entity, known as an entity risk score. Generally, the entity risk score provides a value that indicates an entity's financial and business sustainability.

In an example embodiment, Key Performance Indices (KPIs) are created based on transaction data in a high-volume computer network. Advanced machine learning models are then applied on the generated KPIs to generate an entity risk score for one or more entities involved in the transaction data. Machine learning training functions can be called periodically in a batch mode while inference (predictions) functions can be called in real-time. In some example embodiments, the high-volume computer network is a business network, such as an online network of business entities.

Figure 1:
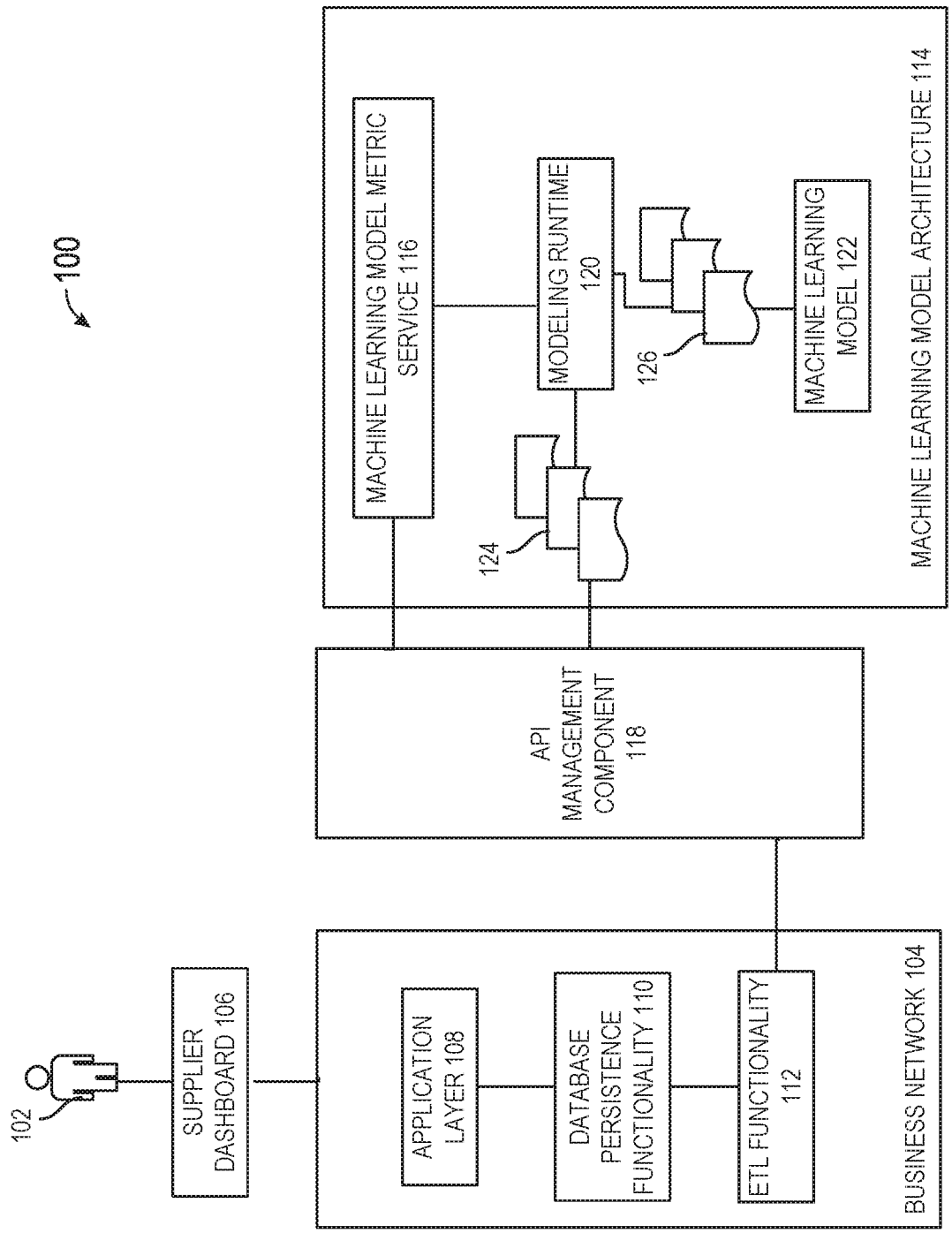
FIG. 1 is a block diagram of a high-volume computer network, in accordance with an example embodiment.

FIG. 1 is a block diagram of a high-volume computer network 100, in accordance with an example embodiment. The high-volume computer network 100 comprises different heterogeneous software and/or hardware components. Specifically, a supplier user 102 may access functionality within business network 104 via a supplier dashboard 106. Business network 104 may include an application layer 108, a database persistence functionality 110, and an extract, transform, and load (ETL) functionality 112. The application layer 108 provides business network functionality to the supplier user 102 via the supplier dashboard 106. The application layer 108 may also provide business network functionality to other users via other dashboards not pictured here, such as to buyer users and third-party users. This business network functionality may include, for example, functionality related to the procurement of goods and/or services from one business entity (supplier) to another business entity (buyer). Transaction data may be stored by the database persistence functionality 110 and can be retrieved using the ETL functionality 112.

Separately, a machine learning model architecture 114 may include a machine learning model metric service 116 that maintains several application program interfaces (APIs) to provide entity risk scores and other related information. These APIs may be maintained by an API management component 118. The machine learning model metric service 116 can be invoked from the application layer 108 of the business network using 104, for example, the Hyper Text Transport Protocol Secure (HTTPS).

In some example embodiments, the machine learning model metric service 116 may provide a stateless connection mechanism in accordance with the Representational State Transfer (REST) architecture paradigm. Data from business network 104 is transferred to the machine learning model architecture 114 by the ETL functionality 112 periodically (e.g., monthly, quarterly) for training. The outcome of this training is a machine learning model 112, which is trained using a training dataset 124 extracted from the database persistence functionality 110 (via, for example, the ETL functionality 112).

Specifically, the modeling runtime 120 may act to generate one or more features 126 from the transaction data. The KPIs described earlier may be one example of such features 126. The one or more features 126 may then be used to train the machine learning model 122, in a process that will be described in more detail later.

When the application 108 invokes an API call through API management component 118 to machine learning model metric service 116 to obtain a new risk score for an entity, non-training transaction data is fed to the machine learning model 122 to obtain an entity risk score. This process occurs in real time, and may be called inference or prediction.

Figure 2:
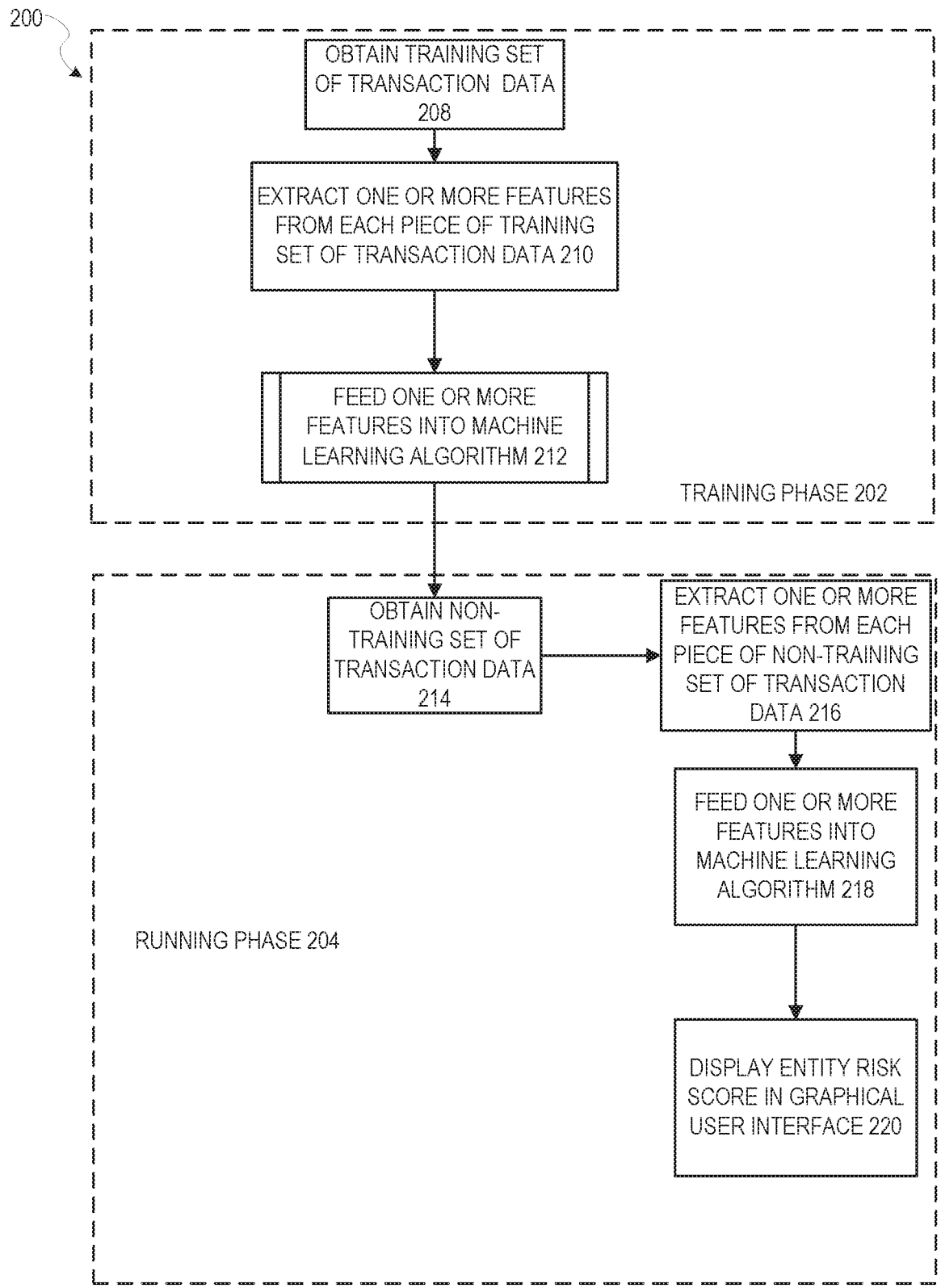
FIG. 2 is a flow diagram illustrating a method of utilizing one or more machine learning models to evaluate entities in a computer network, in accordance with an example embodiment.

FIG. 2 is a flow diagram illustrating a method 200 of utilizing one or more machine learning models to evaluate entities in a computer network, in accordance with an example embodiment. The method 200 may be broken up into two phases: a training phase 202 and a running phase 204. Generally, the training phase 202 involves training one or more machine learning models to generate an entity risk score for entities identified in training transaction data. Once the training phase 202 is complete, the method 200 may progress to a running phase 204 where non-training transaction data is fed to the trained machine learning model(s) to generate entity risk scores for entities identified in the non-training transaction data.

Beginning with the training phase 202, at operation 208 a training set of transaction data is obtained from a database. The training set of transaction data may be training data. Each piece of the training set of transaction data includes an identification of a supplier entity and a receiving entity. At operation 210, one or more features may be extracted from each piece of the training set of transaction data. The mechanism involved in the feature extraction may depend on the underlying feature. As will be seen, these features may be used as a basis for one or more KPI calculations, and thus the features chosen to be extracted will be those that pertain to the one or more KPI calculations.

At operation 212, the one or more features from each piece of the training set of transaction data are fed into a machine learning algorithm to train an entity risk evaluation model to generate an entity risk score for each entity identified in the transaction data. The machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

It should be noted that while operation 212 says "a machine learning algorithm," in some embodiments this operation may actually involve using multiple machine learning algorithms to train multiple entity risk evaluation models whose scores can then be combined. The combination of the multiple entity risk evaluation models may be considered a single entity risk evaluation model.

Operation 212 may include the calculation of one or more KPIs based on the fed one or more features. These KPIs will be described in more detail later. Additionally, operation 212 may include training any number of different multiple entity risk evaluation models. In one example embodiment, operation 212 involves training four different multiple entity risk evaluation models that will be combined into a single omnibus multiple entity risk evaluation model.

Figure 3:
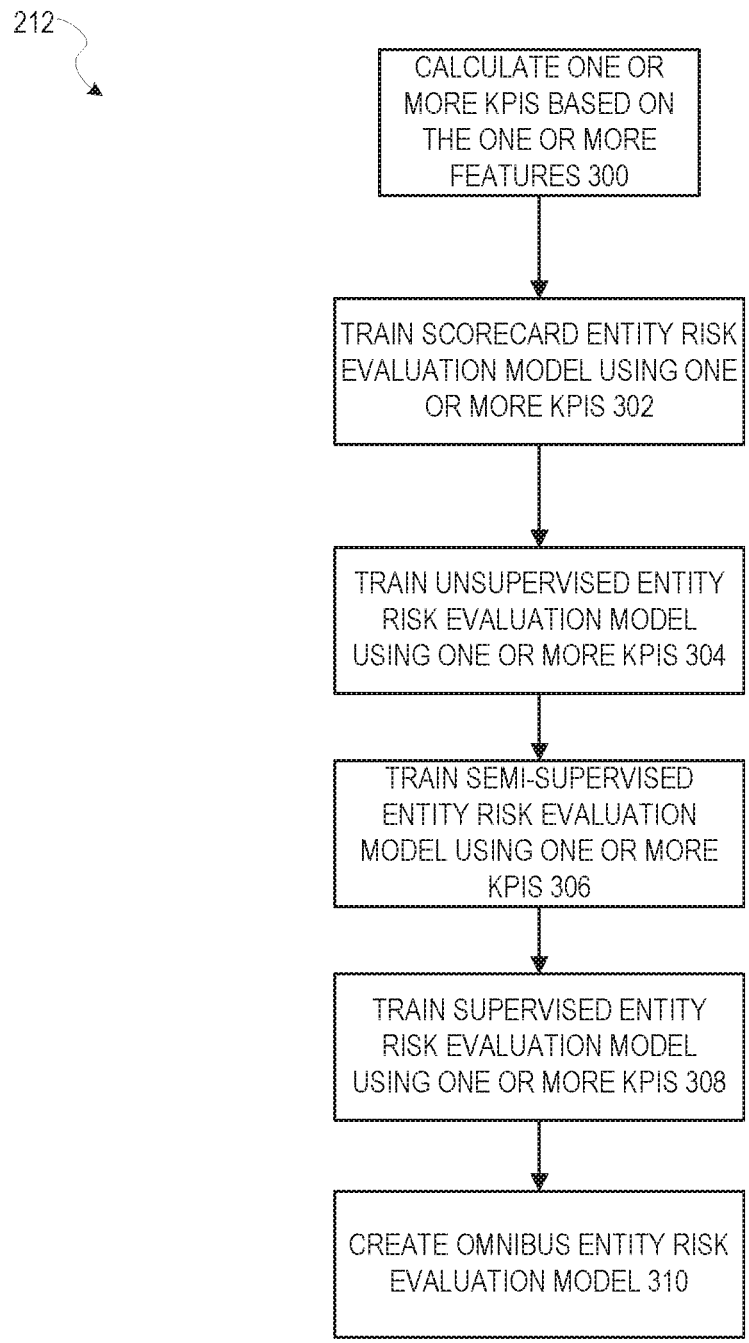
FIG. 3 is a flow diagram illustrating a method of feeding one or more features from each piece of the training set of transaction data into a machine learning algorithm, in accordance with the example embodiment where there are four different multiple entity risk evaluation models.

FIG. 3 is a flow diagram illustrating a method of operation 212 of feeding one or more features from each piece of the training set of transaction data into a machine learning algorithm, in accordance with the example embodiment where there are four different multiple entity risk evaluation models. It should be noted that nothing in FIG. 3 should be taken as limiting FIG. 2 to any particular number of entity risk evaluation models; it is merely one example embodiment.

At operation 300, one or more KPIs are calculated based on the one or more features. At operation 302, a scorecard entity risk evaluation model is trained using one or more of the one or more KPIs. Here, the model divides KPIs into different categories. Each category has a pre-defined weight applied to their contribution to a final entity risk score. Each KPI may be divided into several bins, based on the distribution of that KPI among the whole population of entities. Different bins have different weights. The weighted overall value is then used as the entity risk score. Training this model involves learning the weights.

At operation 304, an unsupervised entity risk evaluation model is trained using one or more of the one or more KPIs. In such an approach, the number of KPIs used as features can be in the hundreds. As such, in an example embodiment an auto-encoder model may be used to reduce the dimension to a manageable size, such as 10-20. This auto-encoder model may be an unsupervised deep learning model. A k-means clustering method may then be applied to new transaction data to group users into N cluster, where N is a predefined parameter. KPIs may be calculated on the centroid of each cluster and these KPIs may then be ranked. Based on the ranking, a score is then assigned to each cluster, with all entities in each cluster receiving the same score.

At operation 306, a semi-supervised entity risk evaluation model is trained using one or more of the one or more KPIs. In such an approach, a small group of the training data may be labeled as "healthy" or "non-healthy" entities. Since two classes are defined, the task of semi-supervised classification is to separate entities into these two classes with a confidence or probability of being in each class (e.g., a probability value between 0 and 1). These labeled training transaction data, in addition to the distribution of all the transaction data (for which there is no label available), are used to create the classification model and define the classification boundaries.

An example definition of such self-training semi-supervised classification model is:
Let L be set of labeled data, U be set of unlabeled data:
Repeat:
Train a Classifier h with training data L
Classify data in U with h
Find $\alpha \in U'$, where $U' \subset U$, with most confident scores.
$L+U' \rightarrow L$
$U-U' \rightarrow U$ As shown, the algorithm starts in the first iteration to define a classification model based on a small group of labeled transaction data, and then classify the whole unlabeled transaction data. Then, training transaction data with highest confidence (probability) are added to the labeled set in the next iteration. These iterations continue until all training transaction data are classified.

For the "best" possible entities (i.e., those with the lowest risk), the values of positive KPIs is maximum, and the value for negative KPIs is minimum. On the other hand, the positive KPIs are at a minimum for the "worst" possible entities, whereas the negative KPIs have maximum value.

Based on this knowledge, the best and worst hypothetical entities can be defined in a KPI space.

Self-training may be employed using the hypothetical best and worst entity, and after a few iterations, a small dataset of labeled entities with high confidence of being in the "healthy" (i.e., low risk) entity group or non-healthy entity group may be formed. This semi-supervised classification may be based on a K-nearest neighbor algorithm.

Figure 4:
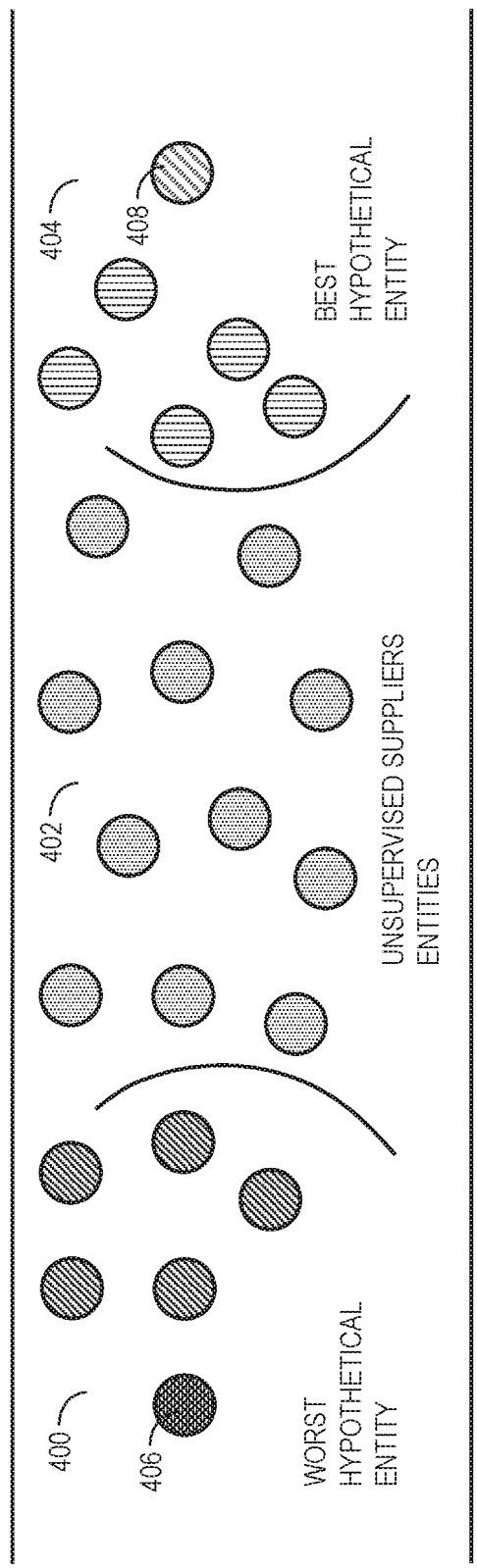
FIG. 4 is a diagram illustrating labeled samples after self training, in accordance with an example embodiment.

FIG. 4 is a diagram illustrating labeled samples after self training, in accordance with an example embodiment. Here, there are three groupings: 400, 402, 404. Grouping 400 represents samples grouped with the worst hypothetical entity 406. Grouping 404 represents samples grouped with the best hypothetical entity 408. Grouping 402 is unsupervised samples.

Once there is enough labeled transaction data from iterations of self training (e.g., around 20% of entities), a regression model may be used to classify the entire population using the samples. The well-distribution probability function in regression classification can be used itself as a score (i.e., probability of being in healthy entities grouping is equal to the score). As a result, the probability of regression classification can be reported as the entity risk score entities. To do so, the resulting probability value ρ can be used, where ρ can be scaled to the range [0, 100]. As a result, the best entity will have a score equal to 100 and the worst will have a score of 0.

Referring back to FIG. 3, at operation 308, a supervised entity risk evaluation model is trained using one or more of the one or more KPIs. In the supervised model, the subset of samples that were previously selected for training the logistic regression model from operation 306 can be fed into a convolutional neural network (CNN) for training. Since the CNN is a deep neural network, it is able to model more complex patterns in data, and perform better in terms of classification.

Figure 5:
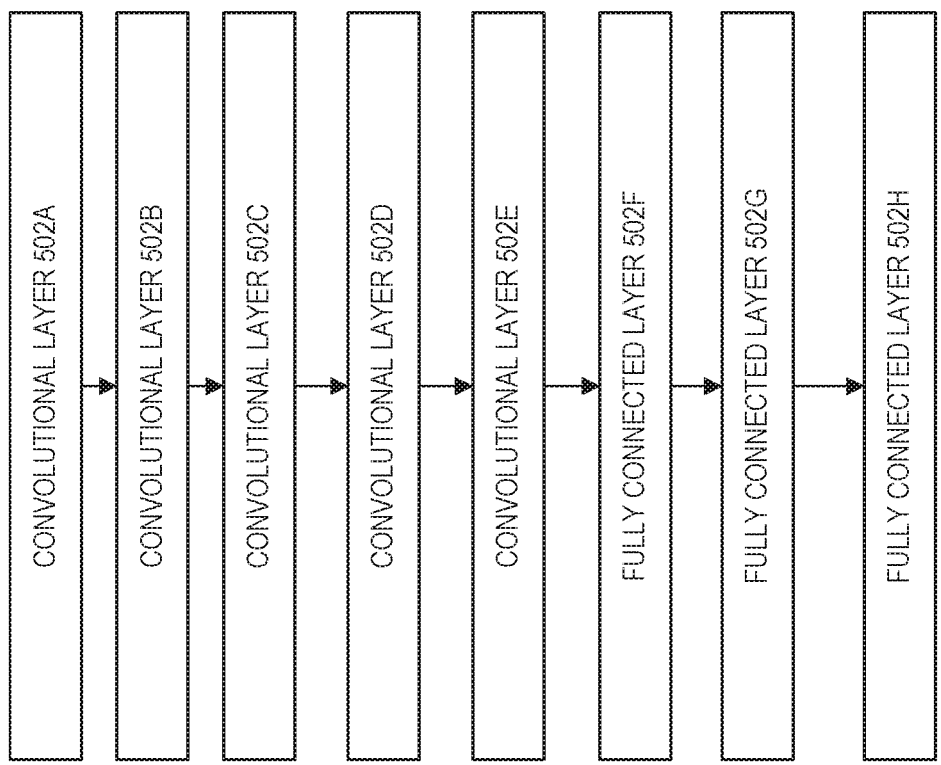
FIG. 5 is a block diagram illustrating a binary classifier convolutional neural network (CNN) in accordance with an example embodiment.

The labeled training data may be composed of two groupings: (1) healthy entities; and (2) non-healthy entities. These samples may be used to train a binary classifier CNN. FIG. 5 is a block diagram illustrating a binary classifier CNN 500 in accordance with an example embodiment. The CNN 500 is made up of eight layers 502A-502H, each with weights. The first five layers 502A-530E are convolutional, whereas the last three layers 502F-502H are fully connected.

The convolutional layers 502A-502E are the core of the CNN 500. Their parameters include a set of learnable filters that have a small receptive field, but extend through the full depth of the input volume. During a forward pass in a convolutional layer 502A-502E, each filter is convolved across the width and height of the input volume, computing the dot product between the entries of the filter and the input and producing a two-dimensional activation map of that filter. As a result, the CNN 500 learns filters that activate when they see some specific type of feature at some spatial position in the input.

The feature maps for all filters can be stacked along the depth dimension to form the full volume output of the convolutional layers 502A-502E. The convolutional layers 502A-502E apply mathematical operations called convolutionals. For two spatial dimensions and an indeterminate amount of non-spatial dimensions (referred to as "channels"), the convolutional is defined using the * operator as follows:

$$y[n, m, d] = x * f = \sum_{o} \sum_{j=-M, k=-N}^{j=M, k=N} x[n, m, o] f_d[n-k, m-j, o]$$

The convolutional layers 502A-502E will typically have some very small support, e.g., N=1 and M=1, such that g[n, m, d]=0 if |n|>1 or |m|>1.

It should be noted that the filters used in the convolutional layers 502A-502E may be activated in a first iteration of the CNN 500 and refined prior to each additional iteration, based on actions taken in other layers in the previous iteration, until some error term is minimized below a particular threshold. In one example embodiment, this may be accomplished through back propagation.

The output of the convolutional layers 502A-502E are sets of arrays called feature maps. Each feature map may be produced by a different filter and modified based on various functions in each stage. At the output, each feature map represents a particular feature extracted at all locations on the input and conditioned.

The high-level reasoning in the neural network is performed via fully connected layers 502F-502H. Neurons in a fully connected layer have full connections to all activations in the previous layer. These activations can be computed with a matrix multiplication followed by a bias offset.

It should be noted that in some example embodiments, additional layers may be included in the CNN 500. A max pooling layer, for example, can be used to perform non-linear down-sampling. A loss layer, for example, specifies how the network training penalizes the deviation between the predicted and true labels.

In an example embodiment, the model is trained on a training set and tested using a validation set. The labels are used to optimize and learn the weights of the CNN 500, and the accuracy of classification in the validation set is calculated to check the model performance.

Referring back to FIG. 3, at operation 310, an omnibus entity risk evaluation model is created by combining the scorecard entity risk evaluation model, unsupervised entity risk evaluation model, semi-supervised entity risk evaluation model, and supervised entity risk evaluation model. This may involve, for example, linking the models by averaging their respective outputs. In other example embodiments, each of the models may have a different weight, and the omnibus entity risk evaluation model is based on a weighted average of their respective outputs. In another example embodiment, these weights themselves may be learned via a machine learning algorithm.

Nevertheless, the result of operation 212 of FIG. 2 is a fully trained entity risk evaluation model designed to output a score for one or more entities when fed transaction data related to those entities.

Referring back to FIG. 2, in a running phase 204, at operation 214 a non-training set of transaction data may be obtained from a database. Here again each piece of the non-training set of transaction data includes an identification of a supplier entity and a receiver entity. Then, at operation 216, one or more features are extracted from each piece of the non-training set of transaction data. These features may be, for example, identical to the features extracted in operation 210 above.

At operation 218, the one or more features from each piece of the non-training set of transaction data are fed into the entity risk evaluation model to generate an entity risk score for a first entity identified in the non-training set of transaction data.

At operation 220, the entity risk score for the first entity is displayed in a graphical user interface. Additional operations may be performed to provide further insight into the entity risk scores.

Figure 6:
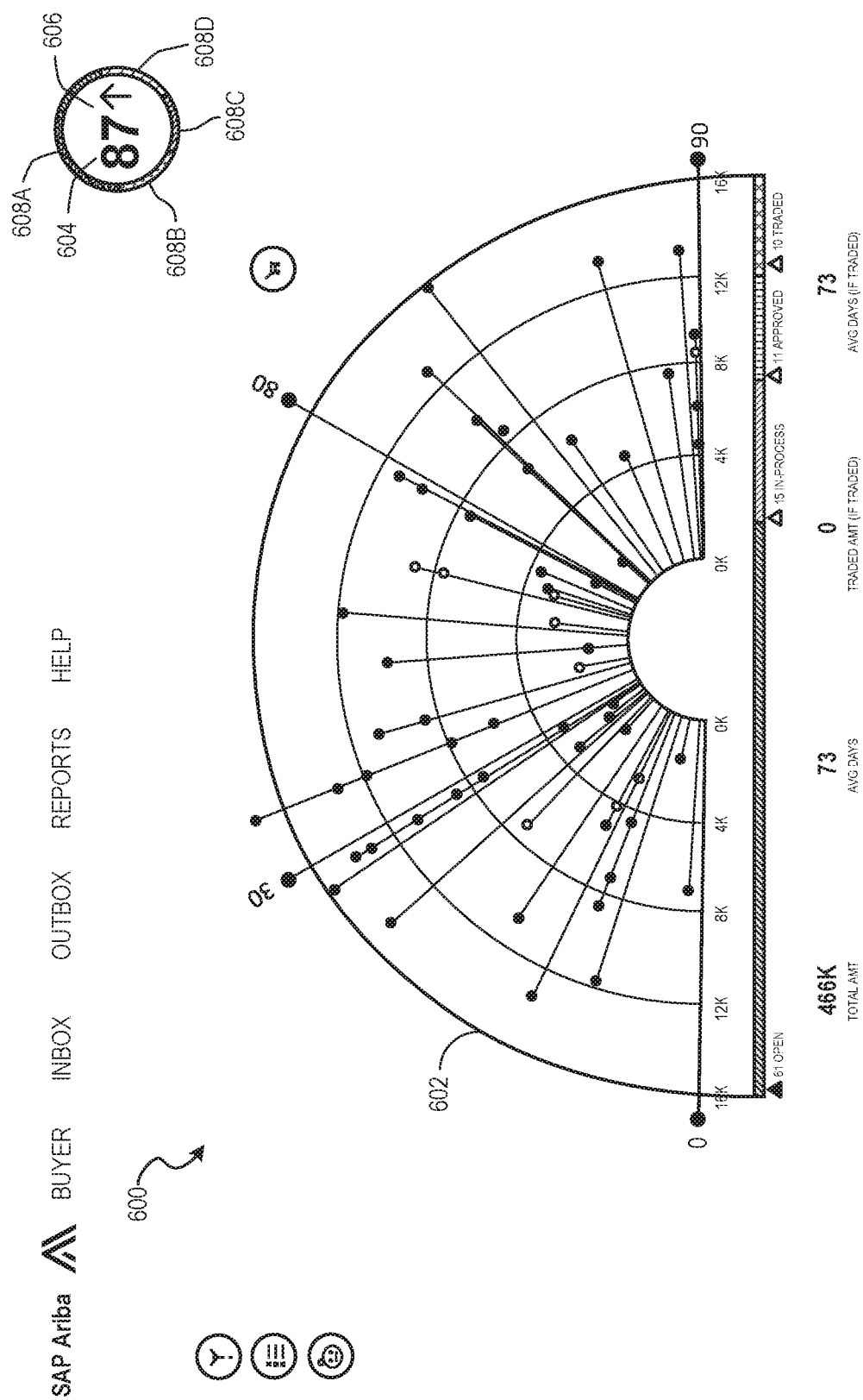
FIG. 6 is a screen capture illustrating a first report page in accordance with an example embodiment.

FIG. 6 is a screen capture illustrating a first report page 600 in accordance with an example embodiment. This first report page 600 may be generated in, for example, a dashboard program and/or a reporting tool. The first report page 600 includes a chart 602 depicting various metrics about an entity, as well as an entity risk score 604. The entity risk score 604 may be surrounded by graphical elements that indicate further information about the entity risk score. Here, an upward arrow 606 is used to indicate that the entity risk score 604 for this particular entity has increased since the last time the entity risk score 604 was viewed by this user (or over some other time period, such as over the last month). Additionally, semicircular portions 608A-608D indicate the amount of contribution of various categories of KPIs. These categories will be described in more detail later.

Figure 7:
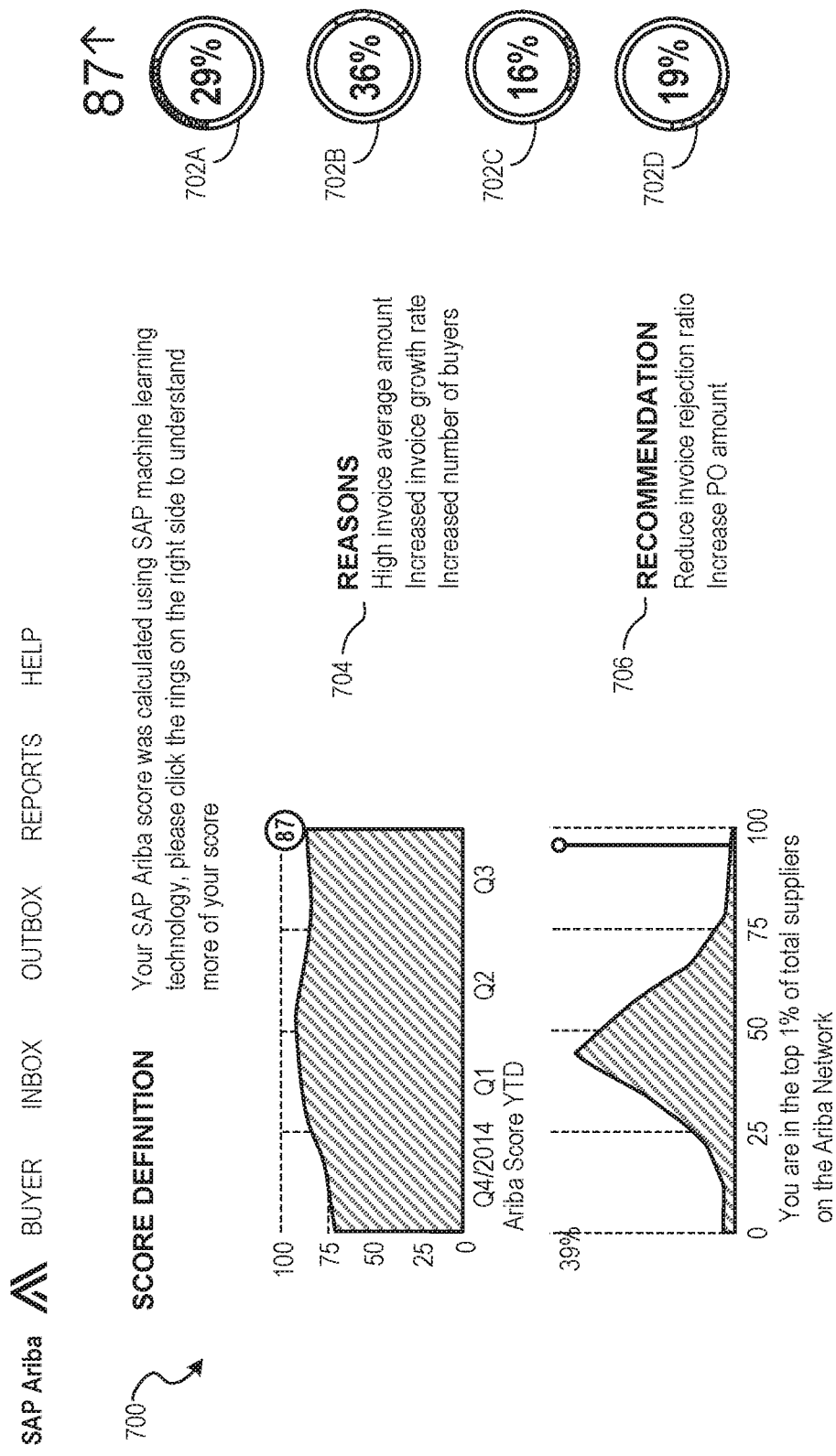
FIG. 7 is a screen capture illustrating a second report page in accordance with an example embodiment.

FIG. 7 is a screen capture illustrating a second report page 700 in accordance with an example embodiment. The second report page 700 may be generated, for example, when a user selects on the entity risk score 604 in the first report page 600, such as by clicking on it. The second report page 700 indicates a score definition for the entity risk score 604.

Here, various contribution levels 702A-702D for the different categories of KPIs are depicted numerically. Specifically, contribution level 702A corresponds to KPIs related to total size, contribution level 702B corresponds to KPIs related to growth rate, contribution level 702C corresponds to KPIs related to rejection rate, and contribution level 702D corresponds to KPIs related to idle period.

Additionally, textual reasons 704 for the entity risk score are provided, as well as recommendations 706 based on the entity risk score.

Figure 8:
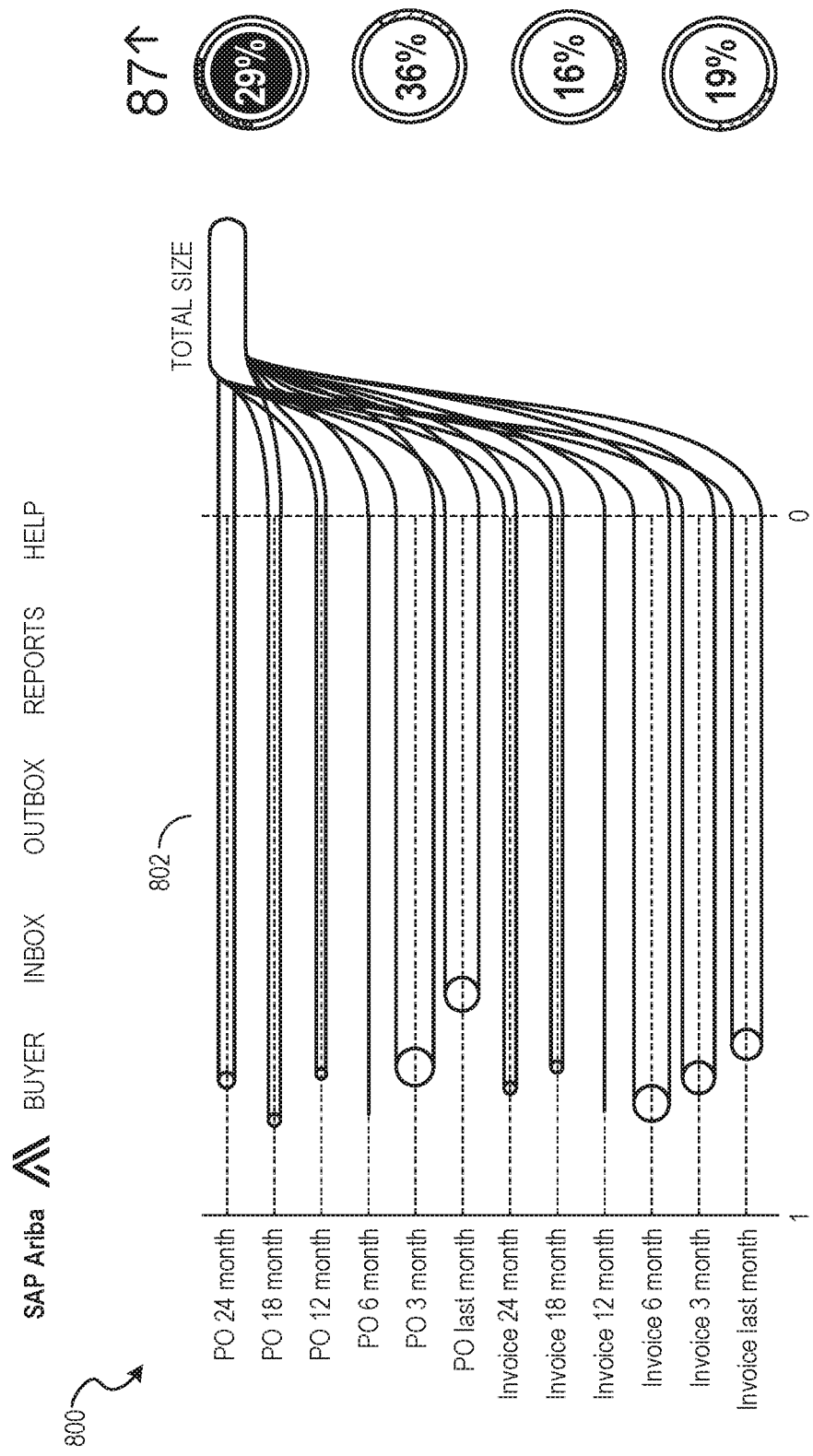
FIG. 8 is a screen capture illustrating a third report page in accordance with an example embodiment.

FIG. 8 is a screen capture illustrating a third report page 800 in accordance with an example embodiment. The third report page 800 may be generated, for example, when a user selects on one of the contribution levels 702A-702D of FIG. 7. Here, the user has selected contribution level 702A. The resulting third report page 800 provides a tree chart 802 showing more information about the KPIs within the corresponding KPI category. The thickness of each line shows the importance or weight of a KPI, and the length shows a normalized value (between 0 and 1) of the KPI for this specific entity.

The following are example categories of KPIs in accordance with an example embodiment:

(1) Purchase order-related KPIs: KPIs in this category include, for example, the number of purchase orders for an entity, the total monetary amount of the purchase orders, the average amount of each transaction, the average amount in a certain period, the number of rejected purchase orders, the percentage of rejected purchase orders, etc. These may be measured in different time periods, such as one month, three months, twelve months, twenty-four months, etc.

(2) Invoice-related KPIs: KPIs in this category include, for example, the number of invoices to/from the entity, the total monetary amount of the invoices, the average amount of each transaction, the average amount in a certain period, the number of rejected invoices, the percentage of rejected invoices, etc. These may be measured in different time periods, such as one month, three months, twelve months, twenty-four months, etc.

(3) Payment-related KPIs: KPIs in this category include, for example, the percentage of purchase orders and invoices that received a discount due to early payment, percentage of partners that received discount due to early payment, average duration of payment term since invoice date to due date, average duration of actual payment term since invoice date to actual payment date, number of late payments, percentage of late payment in terms of amount, etc. These may be measured in different time periods, such as one month, three months, twelve months, twenty-four months, etc.

(4) Relationship-related KPIs: KPIs in this category include, for example, the number of partners (buyer entities/supplier entities), the number of new partners, the average amount in purchase orders or invoices per partner, etc. These may be measured in different time periods, such as one month, three months, twelve months, twenty-four months, etc.

(5) Growth-related KPIs: KPIs in this category include, for example, growth rate in the amount of purchase orders and invoices. These may be measured in different time periods, such as one month, three months, twelve months, twenty-four months, etc.

(6) Activity-related KPIs: KPIs in this category include, for example, idle duration. This may be measured in different time periods, such as one month, three months, twelve months, twenty-four months, etc.

EXAMPLES

Example 1

A system comprising:
a memory;
an application executable by at least one hardware processor of the system to perform operations comprising:
obtaining a non-training set of transaction data from a database, each piece of the non-training set of transaction data including an identification of a supplier entity and a receiver entity;
extracting one or more features from the non-training set of transaction data;
feeding the one or more features into an entity risk evaluation model to generate an entity risk score for each of a plurality of supplier entities and receiver entities identified in the non-training set of transaction data, the entity risk evaluation model having been trained by obtaining a training set of transaction data from the database, the training set of transaction data including an identification of a supplier entity and a receiver entity, extracting one or more features from the training set of transaction data, and feeding the one or more features into a machine learning algorithm to train the entity risk evaluation model to generate an entity risk score for each entity identified in the transaction data;
storing the entity risk scores for each of the plurality of supplier entities and receiver entities in the database;
retrieving the entity risk score for a first entity from the database; and causing display of the entity risk score for the first entity in a graphical user interface.

Example 2

The system of Example 1, wherein the feeding the one or more features from each piece of the training set of transaction data into the machine learning algorithm to train the entity risk evaluation model to generate an entity risk score for each entity identified in the transaction data includes generating, from the one or more features, one or more key performance indices.

Example 3

The system of Example 2, wherein the entity risk evaluation model includes a model trained via a scorecard-based approach.

Example 4

The system of Examples 2 or 3, wherein the entity risk evaluation model includes a model trained via an unsupervised approach.

Example 5

The system of any of Examples 2-4, wherein the entity risk evaluation model includes a model trained via a semi-supervised approach.

Example 6

The system of any of Examples 2-5, wherein the entity risk evaluation model includes a model trained via a supervised approach.

Example 7

The system of Example 2, wherein the entity risk evaluation model is based on a weighted average of outputs of a model trained via a scorecard-based approach, a model trained via an unsupervised approach, a model trained via a semi-supervised approach, and a model trained via a supervised approach.

Example 8

A method comprising:
obtaining a non-training set of transaction data from a database, each piece of the non-training set of transaction data including an identification of a supplier entity and a receiver entity;
extracting one or more features from the non-training set of transaction data;
feeding the one or more features into an entity risk evaluation model to generate an entity risk score for each of a plurality of supplier entities and receiver entities identified in the non-training set of transaction data, the entity risk evaluation model having been trained by obtaining a training set of transaction data from the database, the training set of transaction data including an identification of a supplier entity and a receiver entity, extracting one or more features from the training set of transaction data, and feeding the one or more features into a machine learning algorithm to train the entity risk evaluation model to generate an entity risk score for each entity identified in the transaction data;
storing the entity risk scores for each of the plurality of supplier entities and receiver entities in the database;
retrieving the entity risk score for a first entity from the database; and
causing display of the entity risk score for the first entity in a graphical user interface.

Example 9

The method of Example 8, wherein the feeding the one or more features from each piece of the training set of transaction data into the machine learning algorithm to train the entity risk evaluation model to generate an entity risk score for each entity identified in the transaction data includes generating, from the one or more features, one or more key performance indices.

Example 10

The method of Example 9, wherein the entity risk evaluation model includes a model trained via a scorecard-based approach.

Example 11

The method of Example 9 or 10, wherein the entity risk evaluation model includes a model trained via an unsupervised approach.

Example 12

The method of any of Examples 9-11, wherein the entity risk evaluation model includes a model trained via a semi-supervised approach.

Example 13

The method of any of Examples 9-12, wherein the entity risk evaluation model includes a model trained via a supervised approach.

Example 14

The method of Example 9, wherein the entity risk evaluation model is based on a weighted average of outputs of a model trained via a scorecard-based approach, a model trained via an unsupervised approach, a model trained via a semi-supervised approach, and a model trained via a supervised approach.

Example 15

A non-transitory machine-readable storage medium comprising instructions, which when implemented by one or more machines, cause the one or more machines to perform operations comprising:
obtaining a non-training set of transaction data from a database, each piece of the non-training set of transaction data including an identification of a supplier entity and a receiver entity;
extracting one or more features from the non-training set of transaction data;
feeding the one or more features into an entity risk evaluation model to generate an entity risk score for each of a plurality of supplier entities and receiver entities identified in the non-training set of transaction data, the entity risk evaluation model having been trained by obtaining a training set of transaction data from the database, the training set of transaction data including an identification of a supplier entity and a receiver entity, extracting one or more features from the training set of transaction data, and feeding the one or more features into a machine learning algorithm to train the entity risk evaluation model to generate an entity risk score for each entity identified in the transaction data;

storing the entity risk scores for each of the plurality of supplier entities and receiver entities in the database;

retrieving the entity risk score for a first entity from the database; and causing display of the entity risk score for the first entity in a graphical user interface.

Example 16

The non-transitory machine-readable storage medium of Example 15, wherein the feeding the one or more features from each piece of the training set of transaction data into the machine learning algorithm to train the entity risk evaluation model to generate an entity risk score for each entity identified in the transaction data includes generating, from the one or more features, one or more key performance indices.

Example 17

The non-transitory machine-readable storage medium of Example 16, wherein the entity risk evaluation model includes a model trained via a scorecard-based approach.

Example 18

The non-transitory machine-readable storage medium of Examples 16 or 17, wherein the entity risk evaluation model includes a model trained via an unsupervised approach.

Example 19

The non-transitory machine-readable storage medium of any of Examples 16-18, wherein the entity risk evaluation model includes a model trained via a semi-supervised approach.

Example 20

The non-transitory machine-readable storage medium of any of Examples 16-19, wherein the entity risk evaluation model includes a model trained via a supervised approach.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 9:
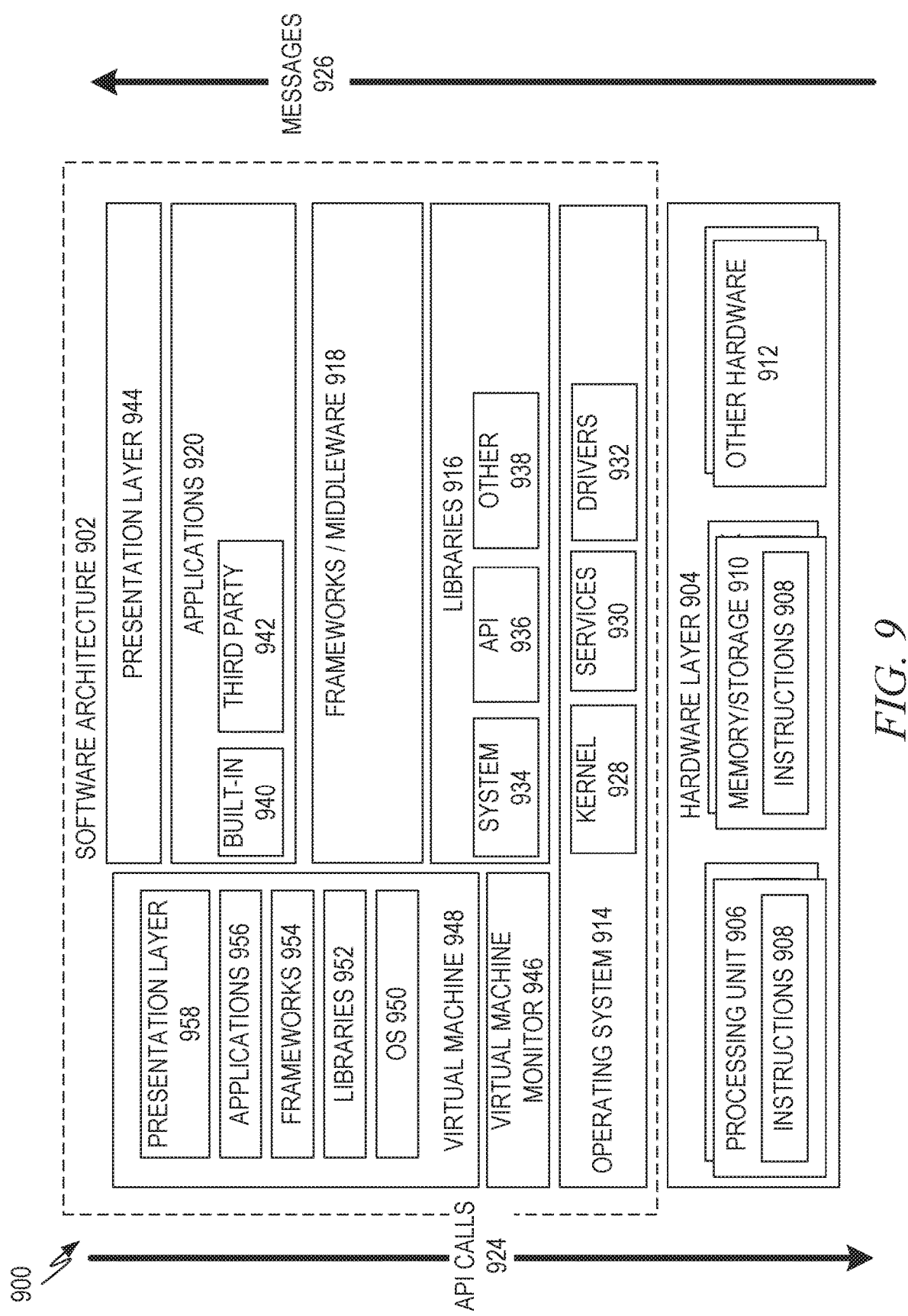
FIG. 9 is a block diagram illustrating a representative software architecture, which may be used in conjunction with various hardware architectures herein described.

FIG. 9 is a block diagram 900 illustrating a representative software architecture 902, which may be used in conjunction with various hardware architectures herein described. FIG. 9 is merely a non-limiting example of a software architecture 902, and it will be appreciated that many other architectures may be implemented to facilitate the functionality described herein. The software architecture 902 may be executing on hardware such as a machine 1000 of FIG. 10 that includes, among other things, processors 1010, memory/storage 1030, and I/O components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and so forth of FIGS. 1-8. The hardware layer 904 also includes memory and/or storage modules 910, which also have the executable instructions 908. The hardware layer 904 may also comprise other hardware 912, which represents any other hardware of the hardware layer 904, such as the other hardware illustrated as part of the machine 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and a presentation layer 944. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature, and not all software architectures have all layers. For example, some mobile or special purpose operating systems may not provide a frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930, and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 942 may invoke the API calls 924 provided by the mobile operating system such as the operating system 914 to facilitate functionality described herein.

The applications 920 may utilize built-in operating system functions (e.g., kernel 928, services 930, and/or drivers 932), libraries (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures utilize virtual machines. In the example of FIG. 9, this is illustrated by a virtual machine 948. A virtual machine creates a software environment where applications/modules can execute as if they were executing on a hardware machine (such as the machine 1000 of FIG. 10, for example). The virtual machine 948 is hosted by a host operating system (operating system 914 in FIG. 9) and typically, although not always, has a virtual machine monitor 946, which manages the operation of the virtual machine 948 as well as the interface with the host operating system (i.e., operating system 914). A software architecture executes within the virtual machine 948, such as an operating system 950, libraries 952, frameworks/middleware 954, applications 956, and/or a presentation layer 958. These layers of software architecture executing within the virtual machine 948 can be the same as corresponding layers previously described or may be different.

Example Machine Architecture and Machine-Readable Medium

Figure 10:
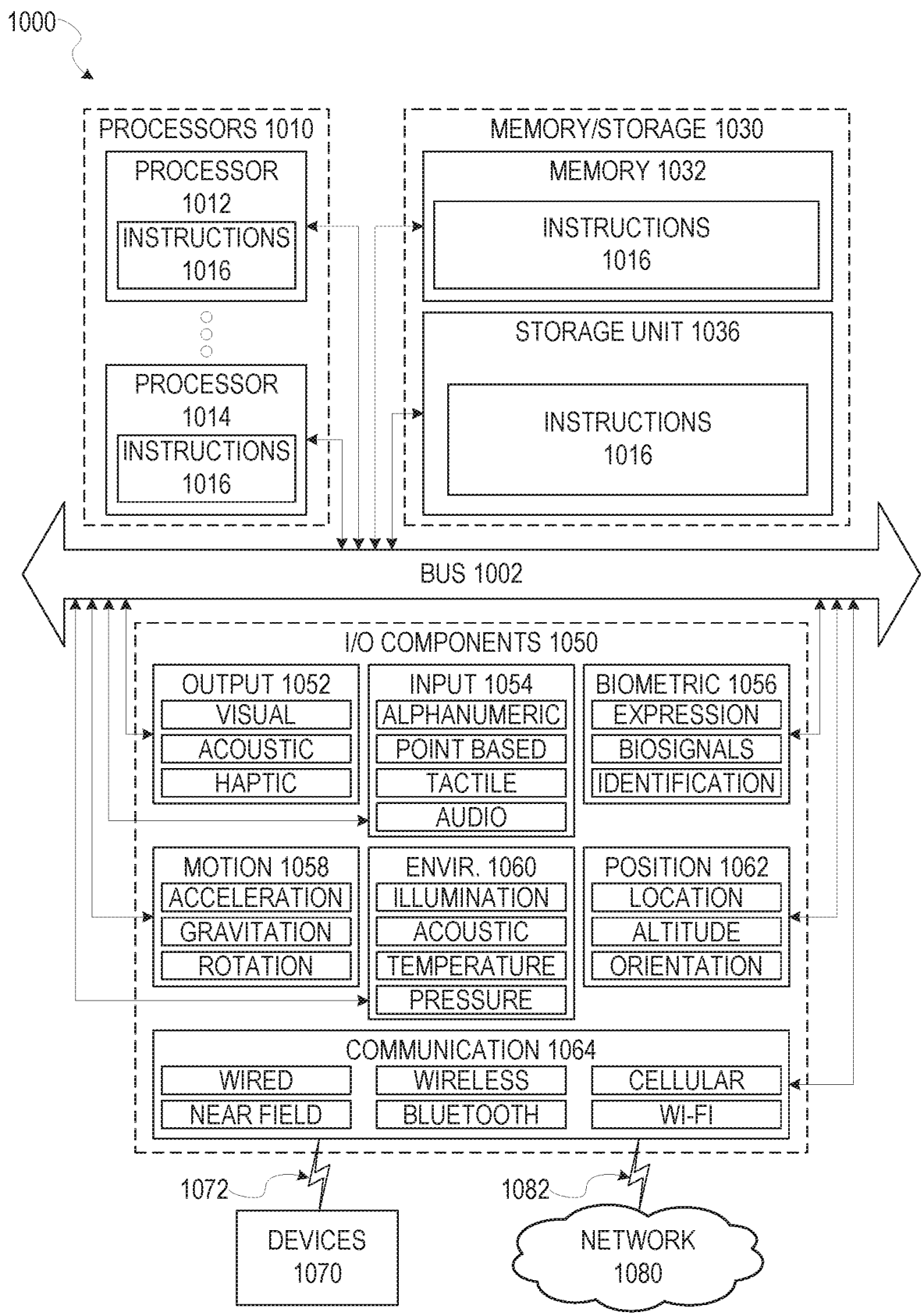
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 1016 from a machine-readable medium (e.g., a machine-readable storage medium) and perform any one or more of the methodologies discussed herein. Specifically, FIG. 10 shows a diagrammatic representation of the machine 1000 in the example form of a computer system, within which the instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the flow diagrams of FIGS. 2 and 3. Additionally, or alternatively, the instructions 1016 may implement modules of FIG. 1, and so forth. The instructions 1016 transform the general, non-programmed machine 1000 into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" may also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1012 and a processor 1014 that may execute the instructions 1016. The term "processor" is intended to include a multi-core processor 1012, 1014 that may comprise two or more independent processors 1012, 1014 (sometimes referred to as "cores") that may execute the instructions 1016 contemporaneously. Although FIG. 10 shows multiple processors 1010, the machine 1000 may include a single processor 1012, 1014 with a single core, a single processor 1012, 1014 with multiple cores (e.g., a multi-core processor 1012, 1014), multiple processors 1012, 1014 with a single core, multiple processors 1012, 1014 with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor 1012, 1014's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store the instructions 1016 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one hardware processor;
   a computer-readable medium storing instructions, which when executed by the at least one hardware processor, performs operations comprising:
   obtaining a non-training set of transaction data from a database, each piece of the non-training set of transaction data including an identification of a supplier entity and a receiver entity;
   extracting one or more features from the non-training set of transaction data;
   generating one or more key performance indices from the one or more features, wherein the key performance indices are measurements calculated from the one or more features;
   feeding the one or more key performance indices into an entity risk evaluation model to generate an entity risk score for each of a plurality of supplier entities and receiver entities identified in the non-training set of transaction data, the entity risk evaluation model having been trained by obtaining a training set of transaction data from the database, the training set of transaction data including an identification of a supplier entity and a receiver entity, extracting one or more features from the training set of transaction data, generating one or more key performance indices from the one or more features from the training set, and feeding the one or more key performance indices from the training set into a machine learning algorithm to train the entity risk evaluation model to generate an entity risk score for each entity identified in the transaction data;
   storing the entity risk scores for each of the plurality of supplier entities and receiver entities in the database;
   retrieving the entity risk score for a first entity from the database; and
   causing display of the entity risk score for the first entity in a graphical user interface.

2. The system of claim 1, wherein the feeding the one or more key performance indices into the machine learning algorithm to train the entity risk evaluation model to generate an entity risk score for each entity identified in the transaction data includes learning a different weight to be applied to each category of key performance index.

3. The system of claim 2, wherein the entity risk evaluation model includes a model trained via a scorecard-based approach.

4. The system of claim 2, wherein the entity risk evaluation model includes a model trained via an unsupervised approach.

5. The system of claim 2, wherein the entity risk evaluation model includes a model trained via a semi-supervised approach.

6. The system of claim 2, wherein the entity risk evaluation model includes a model trained via a supervised approach.

7. The system of claim 2, wherein the entity risk evaluation model is based on a weighted average of outputs of a model trained via a scorecard-based approach, a model trained via an unsupervised approach, a model trained via a semi-supervised approach, and a model trained via a supervised approach.

8. A method comprising:
   obtaining a non-training set of transaction data from a database, each piece of the non-training set of transaction data including an identification of a supplier entity and a receiver entity;
   extracting one or more features from the non-training set of transaction data;
   generating one or more key performance indices from the one or more features, wherein the key performance indices are measurements calculated from the one or more features;
   feeding the one or more key performance indices into an entity risk evaluation model to generate an entity risk score for each of a plurality of supplier entities and receiver entities identified in the non-training set of transaction data, the entity risk evaluation model having been trained by obtaining a training set of transaction data from the database, the training set of transaction data including an identification of a supplier entity and a receiver entity, extracting one or more features from the training set of transaction data, generating one or more key performance indices from the one or more features from the training set, and feeding the one or more key performance indices from the training set into a machine learning algorithm to train the entity risk evaluation model to generate an entity risk score for each entity identified in the transaction data;
   storing the entity risk scores for each of the plurality of supplier entities and receiver entities in the database;
   retrieving the entity risk score for a first entity from the database; and
   causing display of the entity risk score for the first entity in a graphical user interface.

9. The method of claim 8, wherein the feeding the one or more key performance indices into the machine learning algorithm to train the entity risk evaluation model to generate an entity risk score for each entity identified in the transaction data includes learning a different weight to be applied to each category of key performance index.

10. The method of claim 9, wherein the entity risk evaluation model includes a model trained via a scorecard-based approach.

11. The method of claim 9, wherein the entity risk evaluation model includes a model trained via an unsupervised approach.

12. The method of claim 9, wherein the entity risk evaluation model includes a model trained via a semi-supervised approach.

13. The method of claim 9, wherein the entity risk evaluation model includes a model trained via a supervised approach.

14. The method of claim 9, wherein the entity risk evaluation model is based on a weighted average of outputs of a model trained via a scorecard-based approach, a model trained via an unsupervised approach, a model trained via a semi-supervised approach, and a model trained via a supervised approach.

15. A non-transitory machine-readable storage medium comprising instructions, which when implemented by one or more machines, cause the one or more machines to perform operations comprising:
   obtaining a non-training set of transaction data from a database, each piece of the non-training set of transaction data including an identification of a supplier entity and a receiver entity;
   extracting one or more features from the non-training set of transaction data;
   generating one or more key performance indices from the one or more features, wherein the key performance indices are measurements calculated from the one or more features;
   feeding the one or more key performance indices into an entity risk evaluation model to generate an entity risk score for each of a plurality of supplier entities and receiver entities identified in the non-training set of transaction data, the entity risk evaluation model having been trained by obtaining a training set of transaction data from the database, the training set of transaction data including an identification of a supplier entity and a receiver entity, extracting one or more features from the training set of transaction data, generating one or more key performance indices from the one or more features from the training set, and feeding the one or more key performance indices from the training set into a machine learning algorithm to train the entity risk evaluation model to generate an entity risk score for each entity identified in the transaction data;
   storing the entity risk scores for each of the plurality of supplier entities and receiver entities in the database;
   retrieving the entity risk score for a first entity from the database; and
   causing display of the entity risk score for the first entity in a graphical user interface.

16. The non-transitory machine-readable storage medium of claim 15, wherein the feeding the one or more key performance indices into the machine learning algorithm to train the entity risk evaluation model to generate an entity risk score for each entity identified in the transaction data includes learning a different weight to be applied to each category of key performance index.

17. The non-transitory machine-readable storage medium of claim 16, wherein the entity risk evaluation model includes a model trained via a scorecard-based approach.

18. The non-transitory machine-readable storage medium of claim 16, wherein the entity risk evaluation model includes a model trained via an unsupervised approach.

19. The non-transitory machine-readable storage medium of claim 16, wherein the entity risk evaluation model includes a model trained via a semi-supervised approach.

20. The non-transitory machine-readable storage medium of claim 16, wherein the entity risk evaluation model includes a model trained via a supervised approach.

\* \* \* \* \*